(12) United States Patent
Chen et al.

(10) Patent No.: US 9,688,879 B2
(45) Date of Patent: Jun. 27, 2017

(54) NON-FLUORO HYDROPHOBIC AQUEOUS-BASED POLYURETHANE RESIN DISPERSION, AND PRODUCTION METHOD AND USE THEREOF

(71) Applicant: Tamkang University, New Taipei (TW)

(72) Inventors: Kan-Nan Chen, New Taipei (TW); Jing-Zhong Hwang, New Taipei (TW); Rei-Xin Wu, New Taipei (TW); Mei-Ting Lu, New Taipei (TW); Wan-Chun Cai, New Taipei (TW); Chung-Yin Chen, New Taipei (TW); Chia-Hsin Chen, New Taipei (TW)

(73) Assignee: TAMKANG UNIVERSITY, New Taipei (TW)

( * ) Notice: Subject to any disclaimer, the term of this patent is extended or adjusted under 35 U.S.C. 154(b) by 0 days.

(21) Appl. No.: 14/144,534

(22) Filed: Dec. 30, 2013

(65) Prior Publication Data

US 2015/0086713 A1    Mar. 26, 2015

(30) Foreign Application Priority Data

Sep. 23, 2013   (TW) .............................. 102134071 A (51) Int. Cl.
*C08K 5/17*    (2006.01)
*C09D 175/08*    (2006.01)
(Continued)

(52) U.S. Cl.
CPC ......... *C09D 175/08* (2013.01); *C08G 18/003* (2013.01); *C08G 18/0823* (2013.01);
(Continued)

(58) Field of Classification Search
CPC ..... C08G 18/61; C08G 18/755; C09D 175/04
See application file for complete search history.

(56) References Cited

U.S. PATENT DOCUMENTS

| | | | | | |
|---|---|---|---|---|---|
| 4,301,053 | A | * | 11/1981 | Wolfrey | C08G 18/0823 428/412 |
| 5,354,807 | A | * | 10/1994 | Dochniak | C08G 18/0804 524/591 |

(Continued)

OTHER PUBLICATIONS

Zhang et al. Progress in Organic Coatings 63 (2008) 238-244.*
Yu et al. Polym. Chem., 2016, 7, 3913-3922.*

*Primary Examiner* — Michael A Salvitti
(74) *Attorney, Agent, or Firm* — Chun-Ming Shih (57) ABSTRACT

The present invention provides a cross-linking non-fluoro hydrophobic aqueous polyurethane dispersion, which is produced by selecting a compound comprising alcohols, amines, acids, saturated or unsaturated (double-bonded or epoxidized) aliphatic long chain carbon-carbon groups or polydimethylsiloxane comprising alcohol groups, amines, oxosilane to be reacted with IPDI to obtain a PU prepolymer; adding a compound having tertiary amines to neutralize the carboxylic acid of PU prepolymer and adding water to disperse the PU prepolymer; and adding a ambient temperature cross-linking agent to obtain a cross-linking hydrophobic aqueous PU dispersion of the present invention. The hydrophobic aqueous-based PU resin has no fluorine which is friendly to the environment, and may further self cross-links on its applications on fabric, paper, wood, glass and metal surfaces, respectively on drying at ambient temperature which is energy saving process. Its cross-linking reaction of this hydrophobic PU system that will achieve a long-lasting water repellent surface treatment.

2 Claims, 4 Drawing Sheets

(51) Int. Cl.
  *D06M 15/564* (2006.01)
  *D06M 15/568* (2006.01)
  *C09D 175/04* (2006.01)
  *C08G 18/48* (2006.01)
  *C08G 18/61* (2006.01)
  *C08G 18/66* (2006.01)
  *C08G 18/75* (2006.01)
  *C08G 18/00* (2006.01)
  *C08G 18/08* (2006.01)
  *C08G 18/34* (2006.01)
  *C08K 5/053* (2006.01)
  *C08K 5/3412* (2006.01)

(52) U.S. Cl.
  CPC ......... *C08G 18/34* (2013.01); *C08G 18/4854* (2013.01); *C08G 18/61* (2013.01); *C08G 18/6692* (2013.01); *C08G 18/755* (2013.01); *C08K 5/053* (2013.01); *C08K 5/17* (2013.01); *C08K 5/3412* (2013.01); *C09D 175/04* (2013.01); *D06M 15/564* (2013.01); *D06M 15/568* (2013.01)

(56) References Cited

U.S. PATENT DOCUMENTS

| | | | | |
|---|---|---|---|---|
| 5,373,050 A * | 12/1994 | Morikawa | C08G 18/283 | 524/591 |
| 6,291,554 B1 * | 9/2001 | Chen | C08G 59/42 | 523/404 |
| 2003/0032751 A1 * | 2/2003 | Shores | C08G 18/0804 | 528/10 |
| 2003/0198819 A1 * | 10/2003 | Reusmann | C08G 18/0823 | 428/447 |
| 2004/0097683 A1 * | 5/2004 | Yang | C08G 18/10 | 528/28 |
| 2006/0148980 A1 * | 7/2006 | Tielemans | C08G 18/0823 | 524/591 |
| 2006/0258801 A1 * | 11/2006 | Martin | C08G 18/12 | 524/591 |
| 2007/0134502 A1 * | 6/2007 | Fonda | C08G 18/44 | 428/447 |
| 2008/0166485 A1 * | 7/2008 | Steenwinkel | C08F 283/006 | 427/385.5 |
| 2008/0194723 A1 * | 8/2008 | Hwang | C08G 18/0823 | 522/68 |
| 2010/0092689 A1 * | 4/2010 | Chen | D06M 15/564 | 427/513 |
| 2010/0092783 A1 * | 4/2010 | Takahara | C08G 18/0823 | 428/425.6 |
| 2011/0306724 A1 * | 12/2011 | Campbell | C08G 18/0823 | 524/591 |
| 2012/0088861 A1 * | 4/2012 | Huang | C08G 77/42 | 523/107 |
| 2012/0108741 A1 * | 5/2012 | Wu | C09D 175/04 | 524/591 |
| 2015/0086713 A1 * | 3/2015 | Chen | D06M 15/564 | 427/243 |

* cited by examiner

NON-FLUORO HYDROPHOBIC AQUEOUS-BASED POLYURETHANE RESIN DISPERSION, AND PRODUCTION METHOD AND USE THEREOF

BACKGROUND

The present invention relates to aqueous polyurethane (PU) dispersion, and its production method and use, especially a non-fluoro, hydrophobic aqueous PU dispersion, and its production method and use.

Nowadays, the public places importance on outdoor activities, sports and work out. Regarding the dressing while doing exercise, the requirements for a functional dress are light, convenient and comfortable. Hence, this kind of functional dressing becomes the main business of the development. Generally, an outdoor dressing for user to feel comfortable usually requires a water-repellent surface, i.e. its materials have hydrophobic properties, and a property for releasing the moisture from human body at the same time, i.e. the fabric having a breathable function (moisture permeation and sweat release). This kind of product is needed in the current market.

The fabric having a function of moisture permeation and sweat release, which has been sold in market, uses the fabric which is fluoro-containing resin processed, i.e. fluoro-containing acrylic resin or PTFE (polytetrafluoroethylene) attached film. However, these materials already reach its limitation of water-repellent fabric in the aspect of resistance. In addition, no matter using fluoro containing resin or PTFE attached film as material for water-repellent treatment, these materials all have C8-fluoro compounds, PFOA (perfluoro-octanoic acid) or PFOS (perfluoro-octanesulfonic acid) salt and the like. These compounds are certified causing carcinogenesis. Hence, the water repellent having C8-fluoro compounds is eliminated gradually, and will be prohibited from 2015. Although there are low carbon (such as C6 or C4) fluoro-compounds used in market as fluoro-containing water repellent, in order to achieve to an expected water-repellent efficacy, the usage of low carbon fluoro-containing compounds require a higher amount than C8-fluoro-compounds do. This situation is expected to cause an impact to environment, especially the accumulation in alive organism, and further may cause the defects for considering the damage of ecological environment of earth.

In addition, the resin used in resin having fluoro-containing nowadays is acrylic-based resin mainly. When applying it to the coating process, this kind of resin cannot process the following cross-linking reaction. Hence, the processed products of resin having fluoro-content cannot maintain long-term efficacy of water repellent, and this is a problem which the fabric for treating water repellent needs to be dealt with. However, if the method of attached film is carried out, it is necessary for using specific extended PTFE film materials, specific dispensing glue and the facility for attaching film to carry out the process of attaching film for water-repellent fiber. Regarding the cleaning in aspect of customers, it requires specific professional method to clean it and that would be another inconvenience.

Generally, the water-repellent fabric in the market would have the following defects:

1. The bad hand-feel: Using the coating of water repellent having acrylic resin fluoro or PTFE attached film on the surface of fiber causes the stiff feeling when touching the fabric.

2. The poor washing durability: After the process of water-repellent coating, the known water-repellent fabric is only covered by the water repellent on its surface, instead of polymeric inter-penetrating networks (IPN) anchoring in fabric and forming between fabric yarns. Hence, after multiple times of use, it is easy to damage the fabric due to rubbing and washing, further to decrease the water-repellent function. The fabric has the durability decrease.

3. Poor Breathability: The processes material, such as water repellent, is covered on the surface of fabric by the coverage method. Due to overdose of resin coating on, the excess amount of resin plugs the fabric and decreases the original air permeability of fabric. The fabric has the defect on breathability.

4. The cost of protecting environment is too high: In the known knowledge, no matter using the method of coating or attached film, it requires a fluoro-containing polymer that can cause pollution loading, bio-toxicity and the accumulation in alive organism to environment. The fabric has the defect that cause damage to ecology of earth.

To sum up, it is necessary to develop a water repellent having non-fluoro compounds which is valuable and the water repellent needs to be improved urgently.

SUMMARY OF THE INVENTION

The present invention selects non-fluoro compounds and non-toxic compounds having reactive functional groups individually, such as the compounds having hydrophobic property, like aliphatic compounds, i.e. aliphaltic long chain carbon-carbon bonding compounds, or PDMS (polydimethylsiloxane) and the like. As the reactive materials of aqueous polyurethane (PU) resin, a "latent cross-linking (curing) agent" is added, and successfully develops "single-component cross-linking non-fluoro hydrophobic aqueous polyurethane (PU) dispersion". When carrying out applying, i.e. while drying or the pH value of dispersion drops less than 7.0, PU resin would generate a cross-linking reaction with the latent cross-linking agent to increase the cross-linking density of this hydrophobic PU resin, and further to improve washing resistance and solvent resistance of hydrophobic polyurethane resin to reach a long-term hydrophobic (water-repellent) function.

The non-fluoro hydrophobic aqueous polyurethane dispersion having long-term water-repellent function of the present invention comply the requirements of energy saving and carbon dioxide reduction and is expected to replace the fluoro-containing water repellent which is going to be eliminated.

The technical characteristics of the present invention mainly are selecting separately or mix-using a compound comprising alcohols, amines, acids, saturated or unsaturated (double-bonded or epoxidized) aliphatic acids which have reactive aliphatic long chain carbon-carbon bond, for instance, ricinoleic acid, fatty acid ester or oleic acid, or a hydrophobic compound, for instance, polydimethylsiloxane containing alcohol groups, amino groups or oxosilane groups, to react with polyisocyanate as reactive material of hydrophobic polyurethane (PU) resin. In addition, in the material of PU resin, adding compounds containing hydrophilic group (such as COOH) to PU resin. After neutralizing, it would provide a self-emulsified hydrophilic ionic center for PU resin. While adding water to disperse the PU prepolymer, it would form "Self-emulsified Non-fluoro Hydrophobic Aqueous PU dispersion". Further adding a suitable amount of cross-linking agent (such as TMPTA-AZ or CX-100) to form a stable "single-component cross-linking form" aqueous PU dispersion (its pH value maintaining 8.0 or higher belongs stable emulsion). While drying on application (or while the pH value is less than 7.0), i.e. when the ionic groups (COOH) in PU resin and the reactive functional groups (such as aziridine) of cross-linking (curing) agent under room-temperature and dry condition, it would generate a ring-opening cross-linking reaction to increase the cross-linking density in order to improve washing resistance and solvent resistance. The hydrophobic polyurethane resin has a long lasting hydrophobic (water-repellent) function. In the present specification, it would refer this kind of hydrophobic PU as "single-component cross-linking non-fluoro hydrophobic aqueous PU dispersion".

The "single-component cross-linking non-fluoro hydrophobic aqueous PU dispersion" of the present invention has reactive hydrophobic aqueous PU resin, which it can generate interpenetrating polymeric networks (IPN) by self-crosslink reaction to insert between fabric (such as longitudinal yarn and latitudinal yarn), wood, or the fiber of paper and form physical insertion or even chemical bonding under room temperature. The cross-linking reaction of the components of this new invention can carry out under room temperature, and can use a single component or any mixing ratio of aliphatic long chain carbon-carbon bond or PDMS as a hydrophobic PU modified components, especially that the amount of hydrophobic groups requires less amount (5-10%) to reach the water-repellent efficacy.

The non-fluoro hydrophobic PU dispersion of the present invention is coated on the surface of the fabrics by simple coating method (by a method of scraper, roller, impregnation, spray or screen printing and the like), and dried under room temperature to achieve the cross-linking long-term hydrophobic PU resin coating. The processed fabric maintains 85% of the original water-repellent efficacy after washed (after 50 washing cycles) in the test of static contact angle and dynamic sliding angle of water drops.

The present invention provides a production method of non-fluoro hydrophobic aqueous dispersion comprising the following steps: selecting a compound comprising alcohols, amines, acids, saturated or unsaturated (double-bonded or epoxidized) aliphatic groups or polydimethylsiloxane (PDMS) comprising alcohol groups, amino groups, oxosilane groups to be reacted with 3-Isocyanato-methyl-3,5,5-trimethylcyclohexyl isocyanate to obtain a PU prepolymer having NCO terminal group; after neutralizing, adding water to disperse the PU prepolymer to obtain an aqueous PU dispersion; and adding a cross-linking (curing) agent into the aqueous PU dispersion to obtain an ambient temperature self linking aqueous PU dispersion.

Preferably, the unsaturated aliphatic groups have functional groups of alcohol groups, amino groups, carboxyl groups or double bond.

Preferably, the average molecular weight of polydimethylsiloxane is 500-3000, and polydimethylsiloxane has reactive functional groups of alcohol groups, amino groups, carboxyl groups, epoxy groups, oxosilane groups or double bond.

Preferably, the aliphatic containing alcohol group is higher alcohols or diols having carbon numbers from 10 to 30.

Preferably, the aliphatic long chain hydrocarbon has carbon numbers from 10 to 30.

Preferably, the aliphatic containing amino group is the compound having carbon number from 10 to 30.

Preferably, the aliphatic containing double bond is castor oil, palm oil, soybean oil or epoxidized soybean oil.

Preferably, the cross-linking agent is poly-aziridine cross-linking agent.

Preferably, the aqueous polyurethane dispersion which reacts the cross-linking agent comprises aliphatic of aliphatic acids having carbon number from 10 to 30.

Preferably, the polydimethylsiloxane group of the cross-linked aqueous polyurethane dispersion is on the main chain or side chain of polyurethane resin.

The present invention also provides a non-fluoro hydrophobic aqueous polyurethane dispersion, wherein the polyurethane dispersion obtained by the aforementioned production method.

Preferably, the polyurethane dispersion can be made into single-liquid form.

The present invention further provides an use of water repellent applied a polyurethane dispersion, wherein the polyurethane dispersion obtained by the aforementioned production method or is the aforementioned polyurethane dispersion.

Preferably, the polyurethane dispersion is applied on an object which is going to be coated under pH value less than 7 to make the carboxylate reactive functional groups comprised react with a cross-linking agent to generate a ring-opening cross-linking reaction.

Preferably, the object which is going to be coated has hydroxyl groups, carboxylic acids, epoxy groups or amino groups.

Preferably, the silane groups comprised in the polyurethane dispersion reacts with hydroxyl groups or amino groups of the object which is going to be coated to form chemical bonding.

Preferably, the polyurethane dispersion can be coated on a surface of the object which is going to be coated by a method of scraper, roller, impregnation, spray or screen printing and the like.

By using the non-fluoro hydrophobic aqueous PU resin of the present invention, it can reach the following advantages and efficacy:

1. A self-emulsified (having internal ionic groups) aqueous PU dispersion.

2. Being non-fluoro (non-toxic aliphatic long chain carbon-carbon bond compounds or polydimethylsiloxane) and hydrophobic.

3. The self-linking procedure for energy saving and carbon dioxide reduction which may be self cross-linked (under room-temperature dried or pH value being less than 7.0) provides the functions of washing resistance, solvent resistance and long lasting hydrophobic efficacy.

4. PU resin may flexibly adjust the softness and density to provide long lasting hydrophobic (water-repellent) properties.

5. Both of hydrophobic molecular chain domain (groups) aliphatic long chain carbon-carbon bond aliphatics (or fatty acids) and polydimethylsiloxane (PDMS) can be used alone and also can be used together (in different ratios) to achieve complementary hydrophobic properties.

DETAILS OF THE INVENTION

The present invention is described in details by the following embodiments and figures to clarify the production method for non-fluoro hydrophobic aqueous PU dispersion and the application of water-repellent treatment thereof.

(1) The Preparation of Isocyanate Terminated Polyurethane (PU) Prepolymer

Taking 13.4 g of 2,2'-bis(hydroxymethyl) propionic acid (DMPA) and 200 g of polytetramethylene ether glycol (PTMEG-2000) separately and placing them into four-necked reaction tank, and heating to 140° C. to melt DMPA and stirring it with mechanical agitation evenly. Wait for the temperature drop to 50° C., adding 0.1% (w/w) reactive catalyst T-12 and 66.6 g of isophorone diisocyanate (IPDI) and keep reaction temperature below 86° C. with stirring until the reaction is completed (NCO % below the calculated value). After the reaction is completed, processing NCO titration to analyze the degree of reaction, as long as it reaches NCO % is less than 3% and remains at that value for one hour. Further using FT-IR to determine the presence of the NCO peak (near 2267 cm$^{-1}$) in order to make sure that if the reaction is completed or not. The reaction scheme is as the aforementioned scheme 1.

Scheme 1 The preparation of isocyanate-terminated PU prepolymer (2) The Preparation of "Self-Emulsified Aliphatic Long Chain Carbon-Carbon Bond Containing Aqueous PU Dispersion"

Selecting polyether polyol (for instance, PPG or PTMEG), polyisocyanate (IPDI) materials, or diol compounds containing hydrophilic functional groups as internal emulsifier (for instance, dimethylol propanic acid, DMPA) and fatty alcohols (aliphatic long chain carbon-carbon bond alcohol compounds). A long chain carbon-carbon bond containing PU prepolymer having isocyanate as terminal groups (with fatty alcohols involved in the reaction). Determine the amount of NCO to confirm that the reaction is completed, and adding triethylamine to neutralize and adding deionized water and chain extender (such as ethylenediamine) to process the steps of chain extension and dispersion, and the self-emulsified aliphatic long chain carbon-carbon bond containing aqueous PU dispersion is obtained. In this aqueous PU dispersion, adding proper quantity cross-linking agent (TMPTA-AZ or CX100) and maintain the pH value of aqueous PU dispersion system greater than 8.0. The stable "self-emulsified aliphatic long chain carbon-carbon bond containing aqueous PU dispersion" is formed. The details of the preparation scheme please refer to the following scheme 2.

Scheme 2 The preparation of self-emulsified aliphatic long chain carbon-carbon bond containing aqueous PU dispersion Fatty alcohol terminated aqueous-based PU

(3) The Preparation of Room-Temperature Cross-Linked "Single-Liquid Non-Fluoro Hydrophobic Aliphatic Acid (Ester)-Contained Aqueous PU Dispersion"

Selecting polyether polyol (PPG or PTMEG), polyisocyanate (IPDI) materials, or diol compounds containing hydrophilic functional groups as internal emulsifier (DMPA) and high carbon-carbon aliphatic acid compounds to process PU resin. A long chain fatty acid containing PU prepolymer having isocyanate as terminal-ended group (with hydroxyl or epoxidized fatty acid involved in the reaction). This aliphatic PU prepolymer having isocyanate (NCO) as terminal-ended group, and adding aliphatic acids (as stearic acid, oleic acid, epoxidized oleic acid or ricinoleic acid) alone or proper ratio separately in PU prepolymer. Then adding triethylamine to neutralize and adding deionized water and chain extender (such as ethylene diamine) to process the steps of chain extension and dispersion (aliphatic fatty acid becomes soap after neutralization which have emulsified efficacy), and the self-emulsified aliphatic soap-containing aqueous-based PU dispersions is obtained. In this aqueous PU dispersion, adding proper quantity latent cross-linking agent (TMPTA-AZ or CX100) and maintain the pH value of aqueous PU dispersion more than 8.0. The stable "self-emulsified fatty acid-containing aqueous PU dispersion" is formed.

(4) The Preparation of Room-Temperature Cross-Linked "Single-Liquid Non-Fluoro Hydrophobic Polydimethylsiloxane-Contained Aqueous PU Dispersion"

Selecting polyether polyol (PPG or PTMEG), polyisocyanate (IPDI) materials, or diol compounds containing hydrophilic functional groups as internal emulsifier (DMPA) and polydimethylsiloxane(PDMS)-containing diol are added to process PU resin. The PDMS-containing PU prepolymer having isocyanate as terminal-ended group, and then adding triethylamine to neutralize and adding deionized water and chain extender (such as ethylene diamine) to process the steps of chain extension and dispersion, and "self-emulsified polydimethylsiloxane-containing aqueous PU dispersion" is obtained. The details of the preparation scheme please refer to the following scheme 3.

Scheme 3 Preparing polydimethylsiloxane (PDMS)-contained aqueous PU dispersion

NCO-terminated PDMS type PU prepolymer (5) The Room-Temperature Cross-Linking Reaction of "Single-Liquid Non-Fluoro Hydrophobic Aqueous PU Dispersion"

Regarding the "single-component hydrophobic aqueous PU dispersion" of the present invention, the fatty (alcohol or acid) or polydimethylsiloxane (PDMS)-containing aqueous PU dispersion is introduced carboxylic acid group (COOH) separately. After neutralization and dispersion by adding water under a high speed mechanical mixing, the ionic group (carboxyl groups COO—) induced is used as internal emulsifier to provide the stability of aqueous PU dispersion. The latent cross-linking agent containing aziridine functional groups (as TMPTA-AZ or CX-100) added into "single-liquid non-fluoro hydrophobic aqueous PU dispersion" would react with carboxyl groups in PU resin to process open-ring cross-linking reaction under room temperature being dried at ambient temperature. It would react with hydrophilic carboxyl groups and form hydrophobic amino ester bonding, and improve the cross-linking density of aqueous PU resin on drying. The water resistance, solvent resistance, mechanical strength and heat stability would be improved accordingly. Due to the aziridine functional groups contained in aqueous PU as a latent cross-linking agent having high pH value, aziridine can present in water dispersion stably. When under low pH value (<7.0), aziridine would process open-ring reaction with carboxylic acid (COOH) in PU resin or process open-ring reaction itself under room temperature without heating or other energy (the radiation of UV). The details of the cross-linking (curing) reaction please refer to the following scheme 4.

Scheme 4 The cross-linking reaction of aqueous PU resin containing carboxyl groups and polydimethylsiloxane (6) The Treatment of Water-Repellent Coating The aqueous PU dispersion containing different amount of polydimethylsiloxane (PDMS) or aliphatic acid or fatty alcohol is coated by a simple method (scraper, roller, impregnation, spray or screen printing and the like) to process the treatment of water-repellent on the surface of fabric. Under the condition of room temperature, the self-curing (cross-linking) reaction is carried out to form PU resin with interpenetrating networks (IPN) structure tightly and anchored between longitudinal yarn and latitudinal yarn of the fabric, so that it improve the durability of water washing of water-repellent resin treated fabric. After the washing test of National Standard AATCC135-2004 to wash it for 40 cycles, it still remains 85% of the original water-repellent efficacy. This kind of water-repellent PU resin requires only small amount (5-15% solid contents) for coating to achieve water-repellent efficacy.

The present invention is clarified by preferable specific embodiments which are not used to limit the present invention.

The synthesis and preparation of self-emulsified aliphatic long chain carbon-carbon bond containing aqueous PU dispersions

Using different polyols of polymer and polyisocyanates materials, diol compounds containing hydrophilic functional groups as internal emulsifier (such as ionic internal emulsifier and non-ionic internal emulsifier) and fatty alcohol of long chain carbon-carbon aliphatic alcohols compounds to process addition polymerization reaction by different formulating method. The aliphatic long chain carbon-carbon PU oligomer and prepolymer used isocyanate as terminal-ended groups are formed. Further neutralization by a tertiary amine deionized water and chain extender to process the steps of chain extension and water dispersion with mechanical agitation. It results in a formation of self-emulsified aliphatic carbon-carbon chain containing aqueous-based PU dispersions.

The materials which are needed to synthesize self-emulsified aliphatic carbon-carbon chain containing aqueous-based PU dispersions are listed as following:

1. Polyols

The property of polyurethane elastomers is due to the chain structure having flexibility and the structure of minor branching or partial net cross-linking. Polyols with better flexibility are polyesters, polyethers, polyether-ester polyols or polyester-amide polyols and the like.

(a) Polyester Polyols:

(b) Polyether Polyols (PP): The common polyether polyols are as following: polyethylene glycols, polypropylene glycols, polytetramethylene glycols which have the average molecular weight ranging in 400-4000.

2. Polyisocyanates

The most common diisocyante is toluene diisocyanates (TDI), hexamethylene diisocyanate (HDI), isophorone diisocyanate (IPDI), 4,4-methylene diphenyl diisocyanate (MDI) and the like. In aromatic diisocyanates, the main toluene diisocyanates in the market comprise: 80% of 2,4-toluene diisocyanates (TDI) and 20% of 2,6-toluene diisocyanates (TDI). In the 2,4-toluene diisocyanates molecule, the activity of para-(4-) isocyanate functional groups is higher than ortho-(2-,6-) ones by 4 to 5 times. It benefits for producing selective isocyanate prepolymer.

In addition, in aliphatic diisocyanates, two isocyanate functional groups in isophorone diisocyanate (IPDI) show different activity. Without the influence of catalyst, secondary isocyanate functional groups (2°-NCO) have higher reaction rate than the one of primary isocyanate functional groups (1°-NCO). Surprisingly, after adding minor tin catalyst, secondary isocyanate functional groups (2°-NCO) have higher reaction rate than the one of primary isocyanate functional groups (1°-NCO) by 11 to 15 times, which is a dominant advantage. Using the selective isocyanate functional groups in steps of producing polyurethane prepolymer, it benefits for easy operation in producing procedures and the isocyanate prepolymer generated is valuable.

3. Triols cross-linking agent: Glycerol, Trimethylolpropane (TMP), 1,2,6-Hexanetriol, Triethanolamine (TEA) and the like.

4. Ionic Center, such as dimethylolpropanic acid (DMPA), Dimethylolbutanoic acid (DMBA)

5. Aqueous PU ambient temperature cross-linking (curing) agent:

The aliphatic long chain carbon-carbon bond containing-PU oligomer and prepolymer is obtained from a process of the addition polymerization of polyols, polyisocyanates and ionic center (as an internal emulsifier, DMPA). Then proceed a process of neutralization with trialkylamine (e.g. triethylamine, TEA), and chain-extension with ethylenediamine during water dispersion. The internal ionic center within PU resin that having stable micelles of PU particles formation that suspends in the aqueous PU dispersion. The latent PU cross-linking agent is added into the aqueous dispersion and it results in the formation of stable "cross-linking single-component aliphatic long chain carbon-carbon bond containing aqueous PU dispersion" (its pH value>8.0). The cross-linking reaction takes place during drying process at ambient temperature or the pH value drops below 7.0.

This cross-linked PU resin owns the physical and chemical properties of water resistance, solvent resistance, mechanical strength and heat stability would be improved in large scale accordingly. By improving the cross-linking density to enhance the polymeric network structure of PU resin. This latent cross-linking agent (such as TMPTA-AZ) could be triggered the ring-opening reaction self-curing by lowering its pH value of resin system. It is a convenient (single component), energy saving (at ambient temperature) cross-linking reaction takes place immediately when the pH value of PU system lowers than 7.0. The common ambient temperature cross-linking agents are listed as following:

TMPTA-AZ

TPGDA-AZ

HDDA-AZ

Polyisocyanates curing agent

POG curing agent

Epoxy resin

6. Aliphatic alcohols and aliphatic acids of long chain aliphatic compounds:

[1] Octanol, C8, [2] 1-Nonanol, C9, [3] 1-Decanol, C10, [4] Undecanol, C11, [5] Dodecanol, C12, [6] 1-Tetradecanol, C14, [7] Cetyl alcohol, C16, [8] Stearyl alcohol, C18, [9] Arachidyl alcohol, C20, [10] Docosanol, C22, [11] Octanosol, C28, [12] Triacontanol, C30, [13] Policosanol, Cn Aliphatic Acids

[1] Oleic acid, C18, [2] Ricinoleic acid, C18, [3] 12-Hydroxystearic acid, C18), [4] epoxidized oleic acid, C18

Example 1: The Preparation of Isocyanate Terminated Polyurethane (PU) Prepolymer Taking 13.4 g of 2,2'-bis(hydroxymethyl) propionic acid (DMPA) and 200 g of polytetramethylene ether glycol (PTMEG-2000) separately and placing them into four-necked reaction tank, and heating to 140° C. to melt DMPA and stirring it with mechanical agitation evenly. Wait for the temperature drop to 80° C., adding 0.1% (w/w) catalyst (T-12) and 66.6 g of isophorone diisocyanate (IPDI) and keep reaction temperature below 86° C. with stirring until the reaction is completed (NCO % below the calculated value). After the reaction is completed, processing NCO titration to analyze the degree of reaction, as long as it reaches NCO % is less than 3% and remains at that value for one hour. Further using FT-IR to determine the presence of the NCO peak (near 2267 cm$^{-1}$) in order to make sure that if the reaction is completed.

Example 2: Preparing Aliphatic Long Chain Carbon-Carbon Bond Containing PU Oligomer Using isocyanate functional groups having selective diisocyantes (polyisocyanates, IPDI)), triol (glycerol or trimethylolpropane, TMP) and long chain fatty alcohol compounds (fatty alcohol or higher alcohol), by using an excess amount of isocyanates (IPDI), and then adding minor catalyst, dibutyltin dilaurate (DBTDL) to accelerate the reaction being completed. It results in the formation of NCO-terminated aliphatic long chain carbon-carbon bond containing PU oligomer.

Example 3: The Preparation of "Single-Component Aliphatic Long Chain Carbon-Carbon Bond Containing Aqueous PU Dispersion"

Selecting polyether polyol (e.g., PPG or PTMEG), polyisocyanate (IPDI) materials, or diol compounds containing hydrophilic functional groups as internal emulsifier (for instance, dimethylol propanic acid, DMPA) and fatty alcohols (aliphatic long chain carbon-carbon bond alcohol compounds). A long chain carbon-carbon bond containing PU prepolymer having isocyanate as terminal group (with fatty alcohols involved in the reaction). Determine the amount of NCO to confirm that the reaction is completed, and adding triethylamine to neutralize and adding deionized water with a chain extender (such as diethyleneamine) to process the steps of chain extension and dispersion, and the self-emulsified aliphatic-containing aqueous PU dispersions is obtained. In this aqueous PU dispersion, adding proper quantity latent cross-linking agent (TMPTA-AZ or CX100) and maintain the pH value (>8.0) of aqueous PU dispersion. The stable "single-component cross-linking aliphatic long chain carbon-carbon bond containing aqueous PU dispersion" is formed.

Example 4: The Preparation of "Self-Emulsified PDMS-Containing Aqueous PU Dispersion"

Taking 180 g of polydimethylsiloxane (PDMS)diol (for instance, KF-6001) and 13.4 g of dimethylol propanic acid (DMPA, an internal ionic center) separately and placing them into four-necked reaction flask, and heating to 140° C. to melt DMPA under vacuum and with constant mechanical agitation for 4 hours. After cooling down to 50° C., then 0.2 g of catalyst (T-12) and 66.6 g of Isophorone diisocyanate (IPDI) are added into PDMS diol with agitation and keep the reaction temperature below 86° C. until the reaction is completed (NCO % below the calculated value). It results in a formation of PDMS-containing PU prepolymer having isocyanate as terminal groups. An aqueous mixture of de-ionized water of neutralizing agent (triethylamine, TEA) and chain-extender (ethylene diamine) is added into this PDMS-prepolymer slowly with agitation and "self-emulsified PDMS-containing aqueous PU dispersion" is obtained.

Example 5: Cross-Linking PDMS/Oleic Containing Hydridizied PU Dispersions

The ratio of PDMS containing aqueous PU dispersion with oleic soap (oleic acid amine soap) (PDMS/oleic) with 2/1, 1/1 and 1/2, are selected and mixing separately. Then TMPTA-AZ, a latent cross-linking agent (3 phr) is added into each mixture as latent cross-linking agent. Each becomes "cross-linking PDMS/oleic containing hydridizied PU dispersions". After drying at ambient temperature, it results in the formation of cross-linked PDMS/oleic containing hybridized PU resin. Both PDMS and oleic acid are chemical bonded with hydrophobic PU resin. The dried cross-linking PDMS/oleic hybridized hydrophobic PU resin is shown as the following scheme 5.

Mixing PU/oleic acid mixed aqueous dispersion and aqueous PDMS-PU dispersion which are obtained from synthesis reaction by the ratio of 2:1, 1:1 and 1:2, and then adding TMPTA-AZ cross-linking agent. The dried cross-linking scheme is shown as the following scheme 5.

treated PU resin and fabric that improve washing durability and solvent resistance of hydrophobic treated fabrics.

Figure 1:
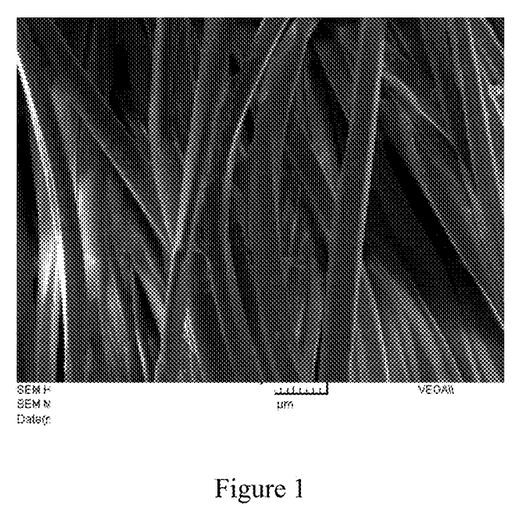
FIG. 1 displays a SEM micrograph of the fiber treated by aqueous PU dispersion containing aliphatic acids and PDMS which are mixed and reacted (unwashed)
Figure 2:
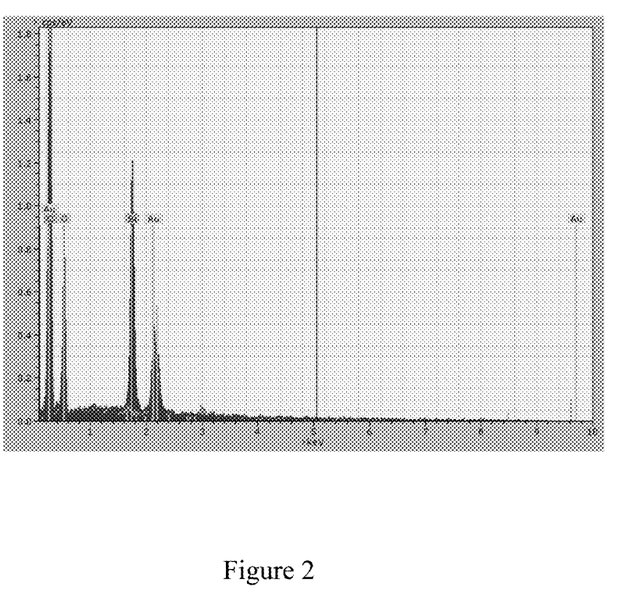
FIG. 2 displays a EDS of the fiber treated by aqueous PU dispersion containing aliphatic acids and PDMS which are mixed and reacted (unwashed)
Figure 3:
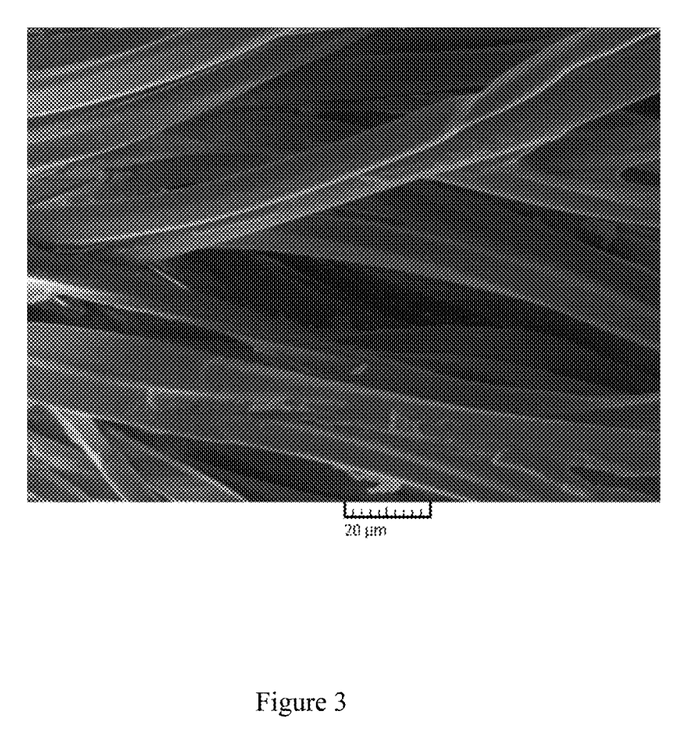
FIG. 3 displays a SEM micrograph of the fiber treated by aqueous PU dispersion containing aliphatic acids and PDMS which are mixed and reacted (after 40 washing cycles)
Figure 4:
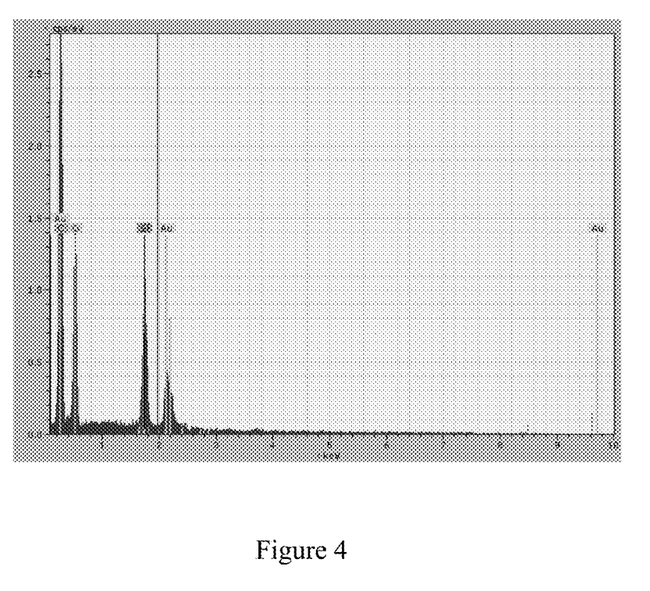
FIG. 4 displays an EDS of the fiber treated by aqueous PU dispersion containing aliphatic acids and PDMS which are mixed and reacted (after 40 washing cycles) (still have silicon on the surface of fiber).

Please refer to Table 1. Shown as the SEM micrographs (FIG. 1 and FIG. 3) and EDS (FIG. 2 and FIG. 4), it proves that the treatment on the surface of fabric by the cross-linked PDMS/oleic containing hybridized PU resin of the present invention can maintain over 85% original hydrophobic property (water-repellent efficacy) after 40 washing cycles, furthermore, it is found that there are silicon of PDMS stays on the surface of fabric (EDS).

Example 6: The Water-Repellent Treatment of Fiber for Room-Temperature Cross-Linking Oleic Acid-Contained and Polydimethylsiloxane(PDMS) Contained Mixing Aqueous Dispersion Following Example 5, diluting the cross-linking PDMS/oleic containing hybridized PU dispersion with de-ionized water to proper concentration (5-10% of solid). Then apply it on the surface of fabric to carry out the hydrophobic treatment. It is cross-linked and forming interpenetrating polymeric network (IPN) structures and anchored into fabric after drying. That improves the bonding strength between

TABLE 1

The hydrophobic property of the fiber surface treated by aqueous PU dispersion containing aliphatic acid and PDMS mixed (washed 40 times)

| | PDMS/oleic ratio of hybridized PU resin | | |
|---|---|---|---|
| | 2/1 | 1/1 | 1/2 |
| Water drop contact angle on treated fabrics (°) | 125.0 | 128.3 | 135.3 |
| Sliding angle of water drops (°) on treated fabric surface | 18.8 | 17.8 | 17.8 |

TABLE 1-continued

The hydrophobic property of the fiber surface treated by aqueous PU dispersion containing aliphatic acid and PDMS mixed (washed 40 times)

| | PDMS/oleic ratio of hybridized PU resin | | |
|---|---|---|---|
| | 2/1 | 1/1 | 1/2 |
| Time for water drops stay on treated fabrics (min) | >60 | >60 | >60 |

To sum up the aforementioned description, the non-fluoro hydrophobic PDMS/oleic containing hybridized PU (polyurethane) resin of the present invention can have long lasting hydrophobic property after 40 washing cycles of treated fabrics. By cross-linking reaction to improve the cross-linking density of hydrophobic PDMS/oleic containing hybridized PU resin of the present invention, it has improved the property of washing durability (resistance) and solvent resistance. Besides, the PU resin of the present invention has no fluoro and the water repellent treatment with less energy requirement which comply with the non-toxic requirements and provision of components used in fabrics in the future to people nowadays. The present invention comparing to prior water repellent which uses fluoro compounds has superior efficacy.

The invention claimed is:

1. A production method of non-fluoro hydrophobic aqueous polyurethane dispersion, which comprises the following steps:
   mixing and reacting a first compound comprising polydimethylsiloxane and higher alcohol or diols having carbon numbers from 10 to 30 and a second compound having hydrophilic functional groups with a polyisocyanate to obtain a polyurethane prepolymer having at least two isocyanate (NCO) terminal groups, so that hydrophobicity of final polyurethane resins is adjustable by regulating a ratio of the polydimethylsiloxane and the higher alcohol or diols to form a hybridized polyurethane resin;
   neutralizing the polyurethane prepolymer, then adding water to disperse the polyurethane prepolymer to form an aqueous polyurethane dispersion which are compatible in any ratios; and
   adding a latent cross-linking agent into a mixture of aqueous polyurethane dispersion to make the aqueous polyurethane dispersion self-crosslinkable.

2. The production method according to claim 1, wherein the latent cross-linking agent is poly-aziridine that reacts with polydimethylsiloxane forming a cross-linked hybridized polyurethane networks.

* * * * *